United States Patent
Robbins

(10) Patent No.: US 9,812,868 B2
(45) Date of Patent: Nov. 7, 2017

(54) SMART JUNCTION BOX FOR PHOTOVOLTAIC SOLAR POWER MODULES WITH SAFE MODE AND RELATED METHOD OF OPERATION

(71) Applicant: Steven Andrew Robbins, Calabasas, CA (US)

(72) Inventor: Steven Andrew Robbins, Calabasas, CA (US)

(73) Assignee: Sunfield Semiconductor Inc.

( * ) Notice: Subject to any disclaimer, the term of this patent is extended or adjusted under 35 U.S.C. 154(b) by 200 days.

(21) Appl. No.: 14/956,856

(22) Filed: Dec. 2, 2015

(65) Prior Publication Data

US 2016/0164457 A1 Jun. 9, 2016

Related U.S. Application Data

(60) Provisional application No. 62/087,160, filed on Dec. 3, 2014.

(51) Int. Cl.
*H02J 3/00* (2006.01)
*H02J 3/38* (2006.01)
*H02S 40/34* (2014.01)
*H02J 1/10* (2006.01)
*H02M 3/04* (2006.01)

(52) U.S. Cl.
CPC ............... *H02J 3/383* (2013.01); *H02J 1/10* (2013.01); *H02M 3/04* (2013.01); *H02S 40/34* (2014.12); *Y02E 10/563* (2013.01); *Y02P 80/11* (2015.11); *Y02P 80/23* (2015.11)

(58) Field of Classification Search
CPC . H02J 3/383; H02J 1/10; H02S 40/34; H02M 3/04
USPC .......................................... 307/80
See application file for complete search history.

(56) References Cited

U.S. PATENT DOCUMENTS

| | | | |
|---|---|---|---|
| 8,169,252 B2 | 5/2012 | Fahrenbruch et al. | |
| 8,618,864 B2 * | 12/2013 | Robbins | ............ H01L 31/02021 327/427 |
| 8,710,351 B2 | 4/2014 | Robbins | |
| 8,842,397 B2 | 9/2014 | Fahrenbruch et al. | |

(Continued)

*Primary Examiner* — Ryan Jager

(57) ABSTRACT

The invention comprises: a smart junction box with a safe mode for photovoltaic solar power modules; and the related method of operation. Power MOSFETs are used as active bypass diodes during the normal operation of the smart junction box, but in safe mode the power MOSFETs are turned on continuously, thereby reducing the output voltage to a safe level of approximately 200 mV. A Non Volatile Memory (NVM) keeps the module in the safe mode after power from the PV cells is interrupted by momentary shading or night. The smart junction box includes transmitter and receiver circuits for wirelessly communicating with other smart junction boxes. The smart junction box enters safe mode in response to receiving a shut-down signal, and exits safe mode in response to receiving a restart signal. The smart junction box acts as a signal repeater, thereby ensuring that the shut-down and restart signals propagate to all junction boxes in the solar array. Some embodiments of the smart junction box include at least one detection circuit for detecting the interruption of current flowing through the junction box, and the receiver circuit typically interprets the detected interruption of current as a shut-down signal.

20 Claims, 9 Drawing Sheets

(56) References Cited

U.S. PATENT DOCUMENTS

| | | | | |
|---|---|---|---|---|
| 9,000,615 B2* | 4/2015 | Robbins | ............ | H01L 31/02021 |
| | | | | 307/116 |
| 9,059,604 B2* | 6/2015 | Johnson | ................ | H02J 3/383 |
| 9,178,353 B2* | 11/2015 | Robbins | ................ | H02H 7/00 |
| 2012/0055530 A1* | 3/2012 | Ger | .................. | H01L 31/02021 |
| | | | | 136/244 |
| 2012/0229161 A1* | 9/2012 | Chen | ..................... | H02S 50/10 |
| | | | | 324/761.01 |
| 2013/0120953 A1* | 5/2013 | Lin | ................ | H01L 31/02021 |
| | | | | 361/807 |
| 2013/0201027 A1* | 8/2013 | Bucher | ................ | H02S 50/10 |
| | | | | 340/660 |
| 2015/0280642 A1* | 10/2015 | Chisenga | ............... | H02S 50/10 |
| | | | | 136/244 |
| 2016/0164457 A1* | 6/2016 | Robbins | ................ | H02S 40/34 |
| | | | | 307/80 |

* cited by examiner

SMART JUNCTION BOX FOR PHOTOVOLTAIC SOLAR POWER MODULES WITH SAFE MODE AND RELATED METHOD OF OPERATION

BACKGROUND

The invention relates generally to the field of photovoltaic (PV) solar power systems, and more specifically to solar power modules, circuits, and methods for making solar power systems safer for firefighters and installer personnel by reducing the risk of electrical shock.

FIG. 1 is a high level diagram of a conventional PV solar power system 10 to illustrate the need for the invention. The system 10 comprises: two PV strings 11 and 12; an inverter 13; and a cutoff switch 14. Each PV string comprises: a plurality of conventional solar power modules 15 connected in series to produce high dc voltage, typically around 600 Vdc; and a blocking diode, 16 and 17. The inverter 13 converts the dc voltage produced by the two strings 11 and 12 into ac voltage that is output onto the electrical grid 18.

One of the problems with conventional PV systems, such as 10, is the danger of electrical shock. Opening the cutoff switch 14 interrupts the current flowing into the inverter 13, but this does not reduce the risk of shock because the PV modules 15 still produce voltage as long as light falls on them. Rooftop solar arrays are a particular concern for firefighters, who may have to walk on the PV modules 15, or even cut through them with a chainsaw. Even a firefighter standing on the ground may be at risk of electrical shock if he is directing a water hose onto a PV array with exposed high-voltage conductors, because the water stream conducts electricity.

The well-known solution to this problem is module-level shut-down (hereinafter referred to as safe mode), wherein each solar module reduces it's output voltage. In normal operation (meaning, not safe mode) and full sunlight, a solar module typically produces about 30 Vdc. But in safe mode the output voltage typically drops to about 200 mV. A string of twenty modules, each being in safe mode, would produce a total of less than 4 Vdc, which is nonhazardous.

There are products on the market that provide safe mode. These products generally fall into two categories: microinverters; and dc power optimizers. But these devices do more than just module-level shut-down; their main function is Distributed Maximum Power Point Tracking (DMPPT) which can recover some of the energy lost due to mismatches between solar modules. The predominant cause of such mismatches is partial shading, which decreases the energy output of the shaded solar modules.

But only a relatively small percentage of solar installations have enough problems with shading to justify the considerable expense of DMPPT products. What the PV solar power industry really needs is a very low cost, highly reliable means of implementing safe mode, without DMPPT, for all the other solar installations that don't have shading problems.

One significant technical challenge for implementing safe mode is reliable communications, so that every solar module in the array receives the signal to enter safe mode, and this challenge is addressed by the present invention.

Every solar power module has a junction box (j-box) affixed to it's back side. A conventional j-box typically just contains three bypass diodes. In the context of this application, a "smart" j-box is one that contains other circuitry in addition to the bypass diodes. For example, smart j-boxes may include: active bypass, DMPPT, safe mode, performance monitoring, diagnostics, arc flash mitigation, and arc fault detection. Almost all of these functions require some means for the smart j-boxes to communicate in a network.

Presently, smart j-boxes typically communicate either by radio (e.g., ZigBee) or Power-Line Communication (PLC). But unfortunately, neither of these technologies is well suited to PV solar arrays, and consequently they are not always reliable enough for critical safety functions such as initiating safe mode.

Radio networks, such as ZigBee, can experience difficulties (e.g., multi-path fading, and excessive data collisions) because solar modules are conductive and therefore reflect radio waves. The ZigBee protocol (based on the IEEE 802.15 standard) was designed to adapt to reflectors in the environment by forming a plurality of ad hoc peer-to-peer links that find their way around the reflectors. This works well be in many environments, such as offices, homes, or even small solar arrays. But sometimes it doesn't work so well in larger solar arrays because there are just too many transmitters and too many reflectors. Even worse, some solar arrays include sun-tracking mechanisms that change the tilt angle, and hence the reflection angle, of the solar modules as the sun moves across the sky during the course of the day, thereby making reflection problems more likely.

PLC also has problems. For example, some solar arrays such as 10 include multiple strings, wired in parallel for increased current output. When an obstruction 19 (e.g., a tree branch, chimney, or power line) shades one of the solar modules 15 is the first string 11, the voltage produced by the first string 11 is less than the voltage produced by the unshaded string 12, so the first blocking diode 16 is reverse-biased. PLC can't communicate through a reverse-biased diode, so all the modules 15 in the first string 11 lose communication for as long as the shade persists.

The invention overcomes the problem of reliable communications while also drastically reducing the cost of implementing safe mode in solar power modules.

SUMMARY

The invention comprises: a smart junction box for PV solar power modules with a safe mode; and the related method of operation.

The smart j-box comprises: a plurality of bypass diodes disposed to protect the PV cells from reverse bias; an electronically controlled switch connected in parallel with each bypass diode for short-circuiting the PV cells while the smart j-box is in safe mode; a plurality of control circuits for controlling the switches; a transmitter and a receiver for communicating with other smart j-boxes in the solar array; a power supply for providing power to operate the circuitry of the smart j-box; and a nonvolatile memory for allowing the smart j-box to remember it is in the safe mode following a temporary loss of power due to insufficient sunlight on the PV cells. Some embodiments also include at least one detection circuit for detecting the interruption of current flow through the smart j-box.

The related method of operation comprises: a first process for relaying signals between smart j-boxes; a second process for managing the nonvolatile memory; and an additional process for each of the plurality of bypass control circuits.

BRIEF DESCRIPTION OF DRAWINGS

The accompanying drawings illustrate the invention. In such drawings.

DETAILED DESCRIPTION

Figure 1:
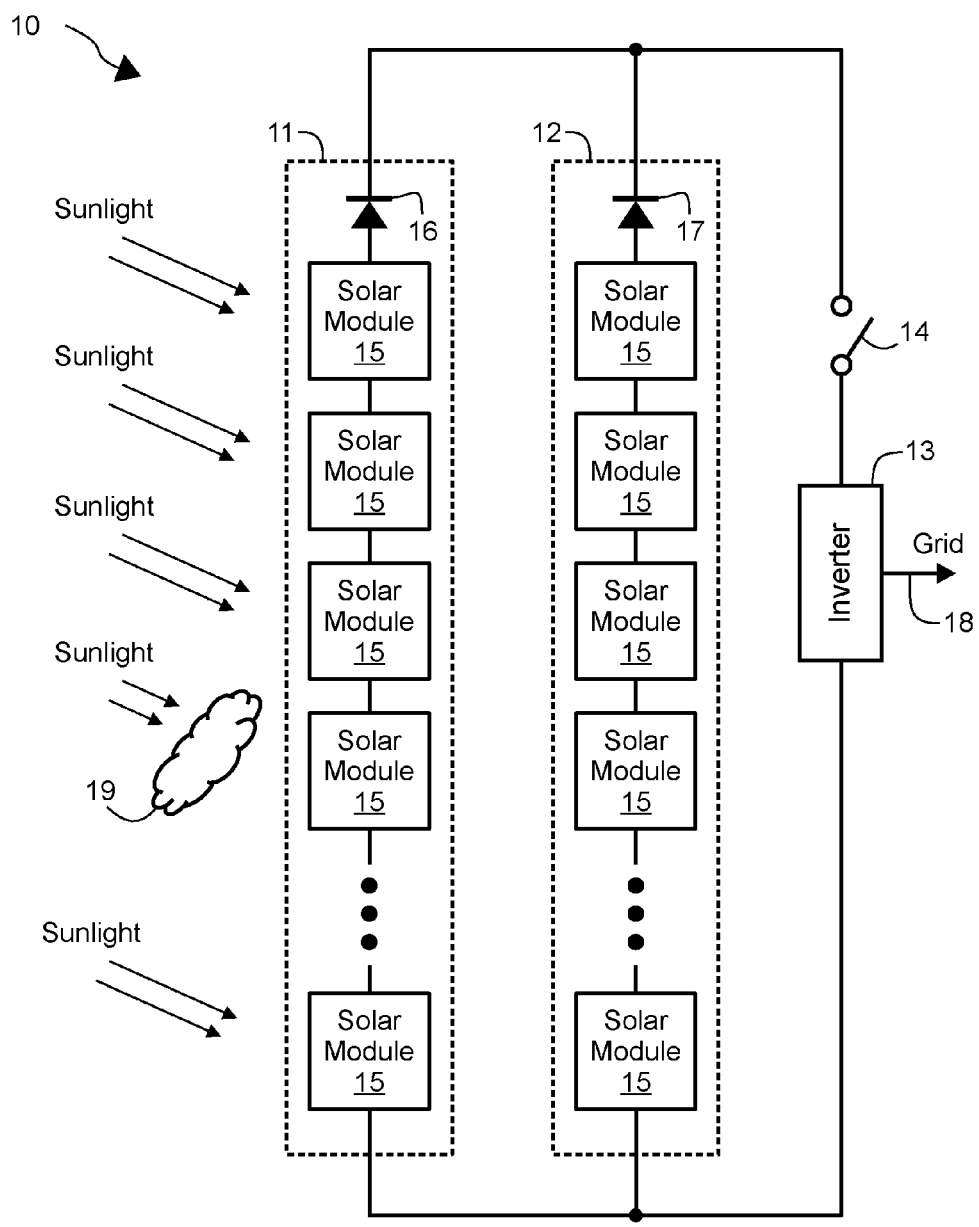
FIG. 1 is a high level diagram of a conventional PV solar power system to illustrate the need for the present invention.
Figure 2:
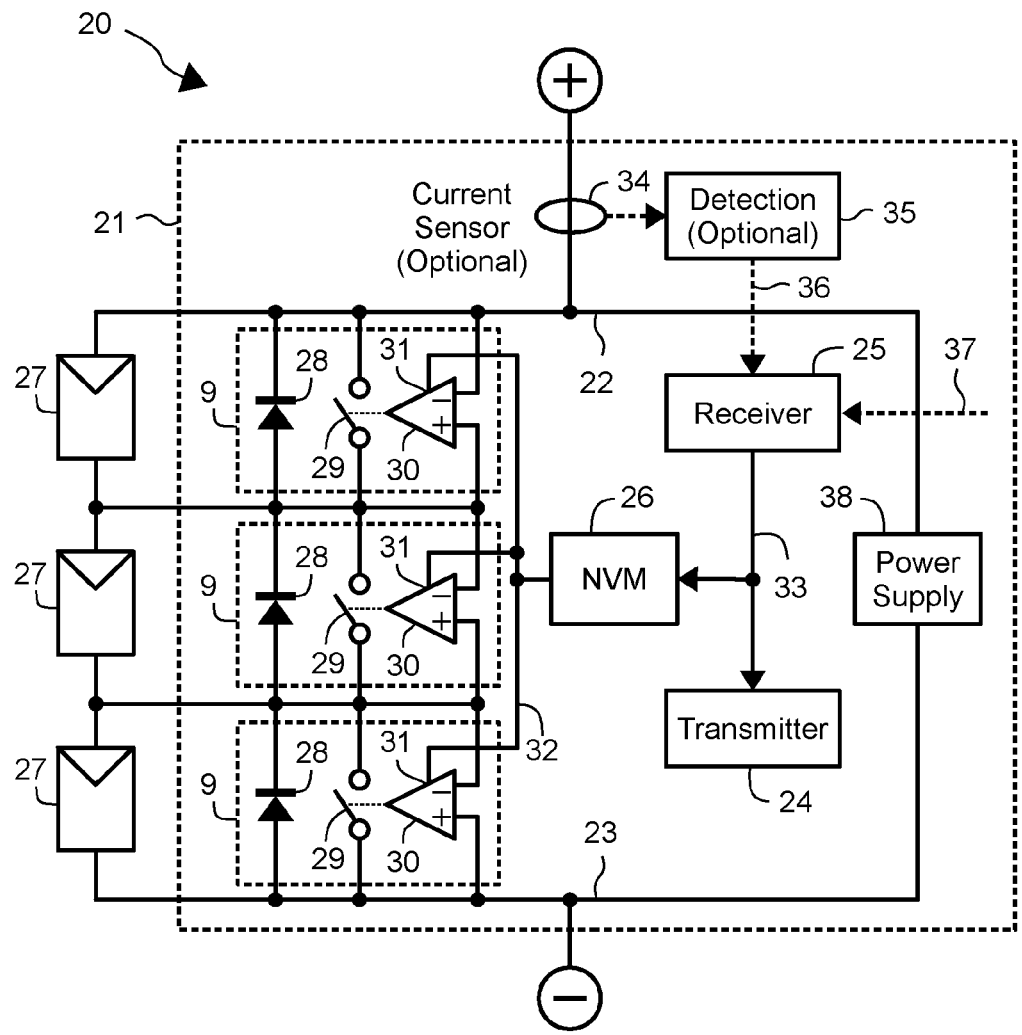
FIG. 2 is a high level diagram a solar power module including the smart j-box.

FIG. 2 is a high level diagram of a solar power module 20 that includes the smart j-box 21. The smart j-box 21 comprises: positive 22 and negative 23 power terminals for connecting the smart j-box 21 to the solar array; a transmitter circuit 24 for transmitting signals to at least other smart j-boxes in the solar array; a receiver circuit 25 for receiving signals from at least other smart j-boxes in the solar array; a Non-Volatile Memory (NVM) 26 having at least a first state and a second state; a plurality of bypass circuits 9 serially connected between the power terminals 22 and 23; and a power supply circuit 38. Each bypass circuit 9 comprises: a bypass diode 28 disposed to protect a PV segment 27 (herein a "segment" is a sub-string typically comprising about twenty four PV cells connected in series) from reverse bias; an electronically controlled switch 29 connected in parallel with the bypass diode 28; and a control circuit 30 for controlling the switch 29. The power supply circuit 38 receives power from the power terminals 22 and 23, and supplies power to at least the transmitter 24, receiver 25, NVM 26, and control circuits 30. The smart j-box 21 may also comprise at least one detection circuit 35 for detecting an interruption in the current flow through the module 20. Such detection circuits may utilize a current sensor 34. Additionally, the smart j-box 21 may include an interface 37 for communication with a gateway device.

Each electronically controlled switch 29 is typically a Metal-Oxide-Semiconductor Field Effect Transistor (MOSFET). And the associated bypass diode 28 is typically the body-diode that is an integral part of the MOSFET.

A well known fact in the field of PV solar power is that every solar module needs bypass diodes to protect it's PV segments from reverse bias. For example, assume a PV segment 27 in one module is shaded, but the rest of the modules in the string are completely unshaded. The shaded segment acts like a bottleneck, restricting current flow in the entire string, and thereby preventing any of the modules from operating at their maximum power point and severely impacting the efficiency of the whole system. But even worse, the unshaded modules can force more current to flow through the shaded segment by reverse-biasing it. The voltage across the shaded segment reverses polarity, so instead of producing electricity, it starts to consume electricity produced by the unshaded modules. The consumed energy is converted into heat, so the shaded segment gets hot. Over time, these hot spots can get smaller and more intense, until finally the module burns or cracks. The bypass diodes 28 are arranged to protect the PV segments 27 from reverse bias by providing an alternate path for the string current around any shaded segments, thereby avoiding damage due to hot stops, and serious loss of system efficiency.

But conventional bypass diodes have a reputation for relatively high failure rates. So increasingly, the PV industry is moving toward replacing conventional bypass diodes with active bypass circuits similar to 9. In normal operation the switches 29 and control circuits 30 provide active bypass. When one of the PV segments 27 is shaded, it's short-circuit output current ($I_{SC}$) is reduced. When $I_{SC}$ is less than the string current ($I_{STRING}$) the bypass diode 28 becomes forward biased, making a positive voltage across the control circuit's inputs, and in response the control circuit 30 closes the switch 29. When the shade is removed, $I_{SC}$ increases and is greater than $I_{STRING}$ so the bypass diode 28 becomes reverse-biased, and the control circuit 30 opens the switch 29.

A key advantage of active bypass circuits over conventional (passive) bypass diodes is greatly reduced heat dissipation. For example, assume one of the PV segments 27 is covered by a blanket, so that it receives no sunlight, reducing it's $I_{SC}$ to zero. So all of $I_{STRING}$ (8 Amps in this example) flows through the associated switch 29. The typical on-resistance of a MOSFET used as the switch 29 is about 5 mΩ, so the power dissipation in the switch is 0.32W. Next, assume the switch 29 and control circuit 30 are omitted, leaving just the diode 28. A conventional bypass diode's forward voltage drop is typically 0.4V at 8 Amps, so the heat produced is now 3.2W. Therefore, in this example, active bypass reduces the heat dissipation from 3.2W to 0.32W, or 90%. This drastic reduction can significantly increase the reliability of the smart j-box by lowering the junction temperatures in the switches 29 and the rest of the active circuitry 24-26, 30, and 38.

Safe mode is when all the switches 29 are closed, thereby effectively short-circuiting the positive 22 terminal to the negative 23 terminal, and reducing the output voltage to around 200 mV. When the receiver 25 receives a shut-down signal, the NVM 26 transitions to a first state, which represents the safe mode. Each control circuit 30 has an input 31 for receiving a signal 32 that represents the NVM state. And the control circuits 30 are adapted to keep the switches 29 closed as long as the NVM 26 is in the first state. When the receiver 25 receives a restart signal, the NVM 26 transitions to a second state which represents normal operation, wherein the control circuits 30 go back to providing the active bypass function.

The NVM 26 allows the smart j-box 21 to remember it is in safe mode while there is no light on the PV cells 27 and the the power supply 38 is unpowered. This is a key aspect of the invention because a solar power system may need to stay in safe mode for days or even weeks during repairs after a fire. It may also be advantageous to ship the solar modules from the factory, already in safe mode, so that installers can handle them without risk of shock.

Figure 3:
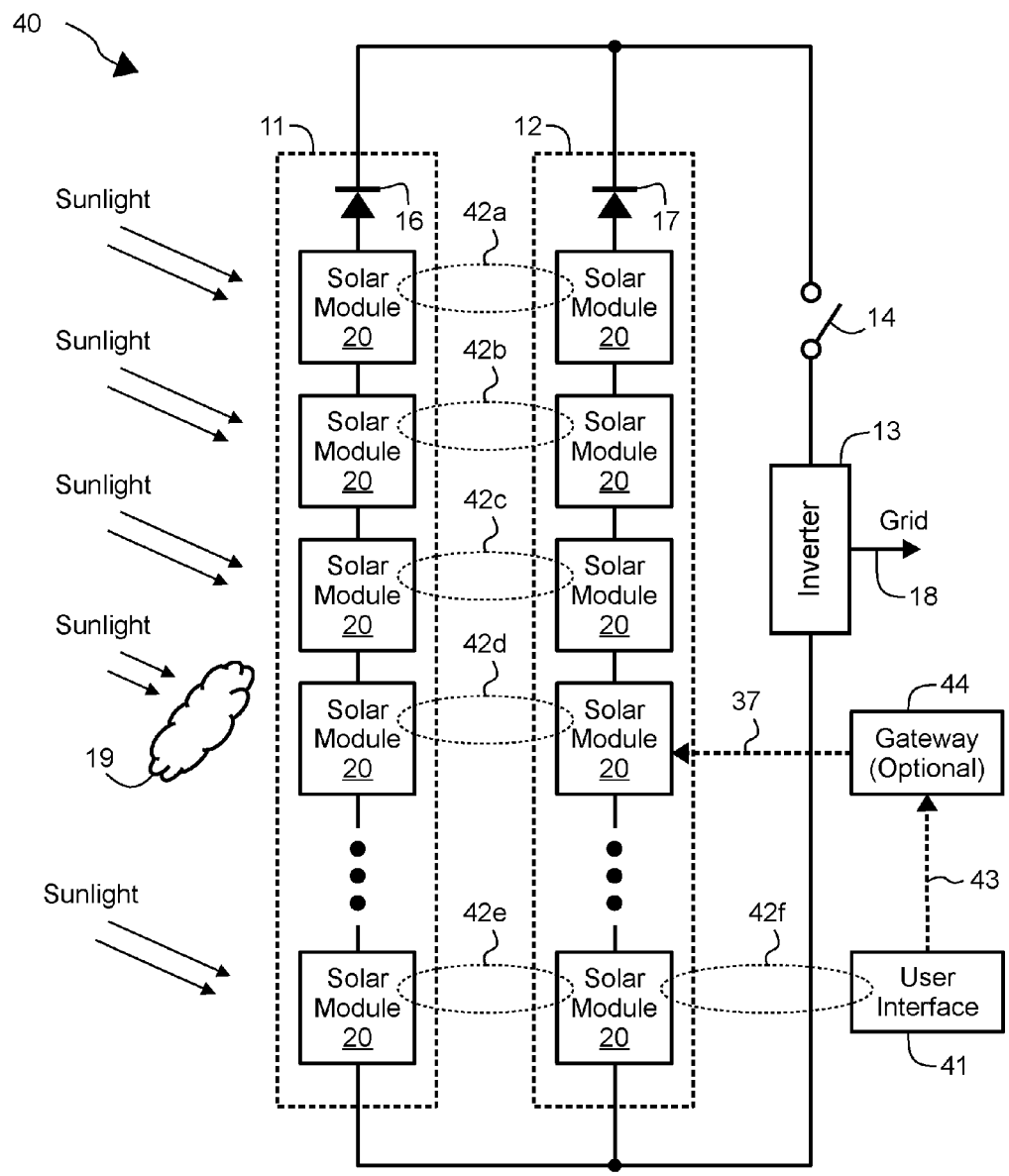
FIG. 3 is a high level diagram of a solar power system comprising solar power modules with the smart j-boxes disclosed herein.

FIG. 3 is a high level diagram of a solar power system 40 that is similarly to 10, but each solar power module 20 includes a smart j-box 21. A user interface device 41 is used to at least transmit wireless signals 42f for telling the system 40 to enter safe mode and then later telling it to exit safe mode.

In one embodiment, the user interface 41 communicates directly with at least one solar module 20 by producing a signal 42f that is received by the receiver circuit 25. In another embodiment, the user interface 41 communicates indirectly with at least one solar module via a gateway device 44; for example, the user interface may be a smart phone, and the signal 43 to the gateway device 44 can be Wi-Fi, Bluetooth, or via the Internet. In either embodiment, the first solar module 20 that receives the signal from the user interface 41 retransmits the signal to other nearby solar modules, and those solar modules, retransmit the signal to others, and so on until all the solar modules in the system 40 receive the signal. Note that only a few of the module-to-module communications 42a-42b are shown to keep FIG. 3 simple.

The wireless signals 42a-42f can be magnetic fields, or sound waves. In a one embodiment, the signals 42a-42f are in the form modulated magnetic fields, typically with a carrier frequency of around 100 kHz. (They are drawn as ellipses in FIG. 3 just to symbolize magnetic flux lines, which always form closed-loops.)

Figure 4:
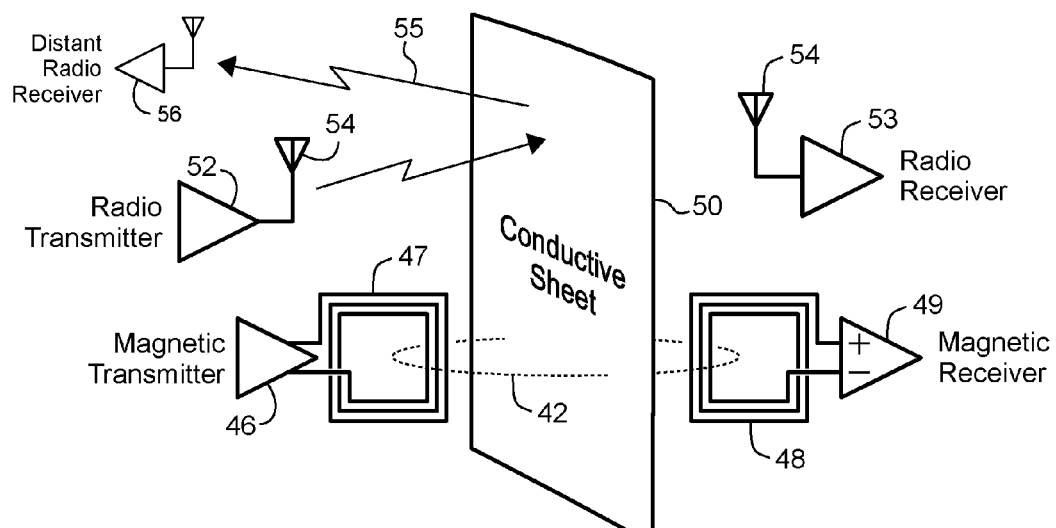
FIG. 4 is a high level diagram to illustrate the concept of magnetic field communication, and it's advantages.

FIG. 4 is a high level diagram illustrating the concept of magnetic field communication, and how it differs from radio. In this example, a magnetic transmitter 46 uses a first magnetic loop 47 to produce a signal in the form of a modulated magnetic flux 42 that is received by a second magnetic loop 48 coupled to a magnetic receiver 49. The two magnetic loops 47-48 can be thought of as two windings of an air-core transformer, with very low coupling coefficient. The magnetic transmitter 46 produces an ac current in the first magnetic loop 47, thereby producing time-varying magnetic flux 42. But these flux lines don't propagate (travel) like radio waves would; instead, the quasi-static magnetic flux lines stay in a relatively small region surrounding the magnetic loop 47, similar to the static magnetic flux lines that surround a common refrigerator magnet. The flux lines fan out in all directions in the plane of the first magnetic loop 47, and a small percentage of them pass through the second magnetic loop 48, producing a small ac current that is amplified by the magnetic receiver 49. Notably, the flux lines 42 easily penetrate the nonferrous conductive sheet 50. In contrast, a radio transmitter 52 with radio antenna 54 may have difficulty communicating with the radio receiver 53 because the conductive sheet 50 reflects the electromagnetic fields 55 (radio waves). In fact, the reflected radio signal 55 may be received by some distant, unintended receiver 56, for example in a different solar array.

Because the range of magnetic field communication is so short, typically just three feet or less, each smart j-box is able to communicate only with it's nearest neighbors in the array. Therefore, each smart j-box must relay the signal to other smart j-boxes, as described above. FIG. 3 shows the magnetic communication links 42a-42e going horizontally between modules 20 in the first string 11 and modules in the second string 12, but this is just to keep the diagram simple. The magnetic flux lines emanate from each magnetic loop in all directions in the plane of the solar array, so in FIG. 3 each module is also able to communicate with it's nearest neighbor above and below it.

In another embodiment the wireless communications 42a-42f are via sound waves. The transmitter 24 is typically a piezoelectric transducer that produces an audible signal, and the receiver 25 is a microphone. This form of communication also can have a short range, similar to magnetic communications, because of sound-absorbing materials close to the smart j-box. For example, the sound emitted from the transmitter is typically attenuated by the enclosure of the smart j-box, since there are typically no holes in the enclosure to allow the sound to escape because the j-box must be sealed to keep moisture out. Also, the material under the j-box can partially absorb sound. For example, if the solar array is mounted on a roof with wooden shingles, they can absorb sound.

One key advantage of using sound for communication is that it provides firefighters with a positive indication (audible beeps) that the solar array is safe. Another advantage is that many commonly available devices, such as smart phones or smart watches, can emit sounds and therefore can serve as the user interface device 41. For example, picture a firefighter wearing a smart watch that periodically emits an audible signal telling the solar array to shut down. The array will shut down as soon as the firefighter comes near enough for at least one of the smart j-boxes to hear the signal. Nobody can restart the array as long as he is near it and his watch continues to send the shutdown signal. And he knows the array is safe because he can hear the solar modules repeating the shutdown signal. Even in a noisy environment where he may not be able to hear the signals from the solar modules, his watch can hear it, and would display "SAFE" on it's face.

Sometimes the short range of magnetic or sound communication is inconvenient, so a gateway device 44 can be used to allow the user to control the array from a significant distance. An array typically has just one gateway device 44 connected to one solar module 20, but sometimes two gateway devices are used (usually at opposite corners of the array) in case one module 20 is damaged, or is unpowered because something is covering it's PV cells. The gateway device 44 typically connects directly to the circuit board inside the smart j-box. For example, the gateway device 44 may be a daughter board that attaches to the main circuit board inside the j-box via a connector and is powered by the power supply 38. The user interface 41 connects to the gateway 44 via a network link 43. The network link 43 can be, without limitation, radio (e.g., Bluetooth, WiFi, ZigBee), PLC, fiber optic, or a wired connection. The network link 43 could also be via the Internet. When a gateway device 44 is used, the user interface device 41 may omit the circuitry for direct communication 42f with the solar modules. The receiver 25 is typically adapted to interpret shut-down and restart signals from the gateway interface 37 just as if they were received via the short range communication links.

The detection circuit 35 gives the user yet another way to initiate safe mode, by opening the cutoff switch 14. Alternatively, a firefighter may disconnect or even cut through a cable. In either case, the interruption of current flow triggers the detection circuit 35, and in response the detection circuit outputs a signal 36 to the receiver 25. The receiver is typically adapted to interpret the detection signal 36 as a shut-down signal, just as if it had received the shut-down signal via the short range wireless communication links.

This is often the preferred way of shutting down a small solar array that has only one string, such as a typical residential solar array, or a large array wherein each string is coupled to it's own separate inverter. But in a solar array such as 40, with two or more strings wired in parallel, the detection circuit 35 is typically disabled, disconnected, or omitted to avoid inadvertent shut-downs due to shading; for example, in system 40 when the blocking diode 16 becomes reverse-biased because of shade 19, the current through the first string 11 is interrupted, which could trigger the detection circuit 35 in each module 20 in the first string, thereby shutting down the entire array. But, even when the detection circuit 35 is disconnected from the receiver 25 to prevent inadvertent shut-downs, the detection circuit may still be enabled for use in arc flash mitigation.

It would be obvious to anyone with ordinary skill in electronic circuit design that the detection circuit 35 could utilize a current sensor 34 to determine when the current flow is interrupted. For example, the current sensor 34 would typically be either a low-value resistor or a current transformer. But both these approaches have disadvantages. A current-sense resistor wastes power and increases the temperature inside the j-box; for example, a 10 mΩ resistor dissipates 0.64W @ $I_{STRING}$=8 A. Alternatively, a current transformer would typically dissipate much less heat, but is relatively very expensive and bulky.

A better approach utilizes the parasitic inductance and capacitance of the PV segments 27 to detect the interruption of $I_{STRING}$. The physical arrangement of the PV cells on the surface of the solar power module produces an unavoidable parasitic inductance ($L_{PV}$), typically around 4 µH. Each PV cell has significant junction capacitance, typically greater than 50 nF. Furthermore, a solar power module typically includes sixty PV cells connected in series, so the equivalent capacitance ($C_{EQ}$) is typically about 100 pF. The combination of these parasitics makes a complex resonator, but with a dominant pair of poles, so it can be approximated as a simple LC circuit. Essentially, a sudden change in $I_{STRING}$ produces a significant voltage ringing in this resonator. Therefore, the detection circuit 35 can detect the interruption in current by looking for such voltage transients.

Figure 5:
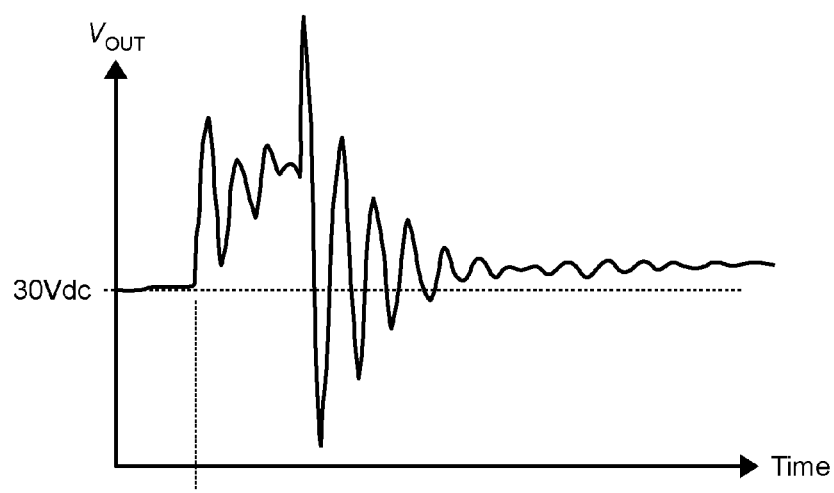
FIG. 5 is a an example waveform showing a voltage transient resulting from opening the cutoff switch.

FIG. 5 is a typical example waveform where initially $V_{OUT}$=30 Vdc, and $I_{STRING}$=2 Adc. At time to the cutoff switch 14 is opened. The ringing (primarily due to the resonance of $L_{PV}$ and $C_{EQ}$) has a natural frequency of about 8MHz, and is about 25V peak-to-peak. The waveform appears somewhat irregular because it is actually the superposition of several under-damped second-order transients resulting from contact-bounce in the cutoff switch. Voltage transients such as these are many times larger than the normal switching transients typically produced by the inverter 13, and therefore it is relatively easy to design a detector circuit 35 to detect them.

The detection circuit 35 has two key performance parameters: the probability of a false alarm; and the probability of not detecting when the cutoff switch opens. Obviously, both parameters should be as low as possible, but it's a trade-off; making one parameter lower typically makes the other higher. Best performance is achieved by using a plurality of detection circuits rather than just one.

Figure 6:
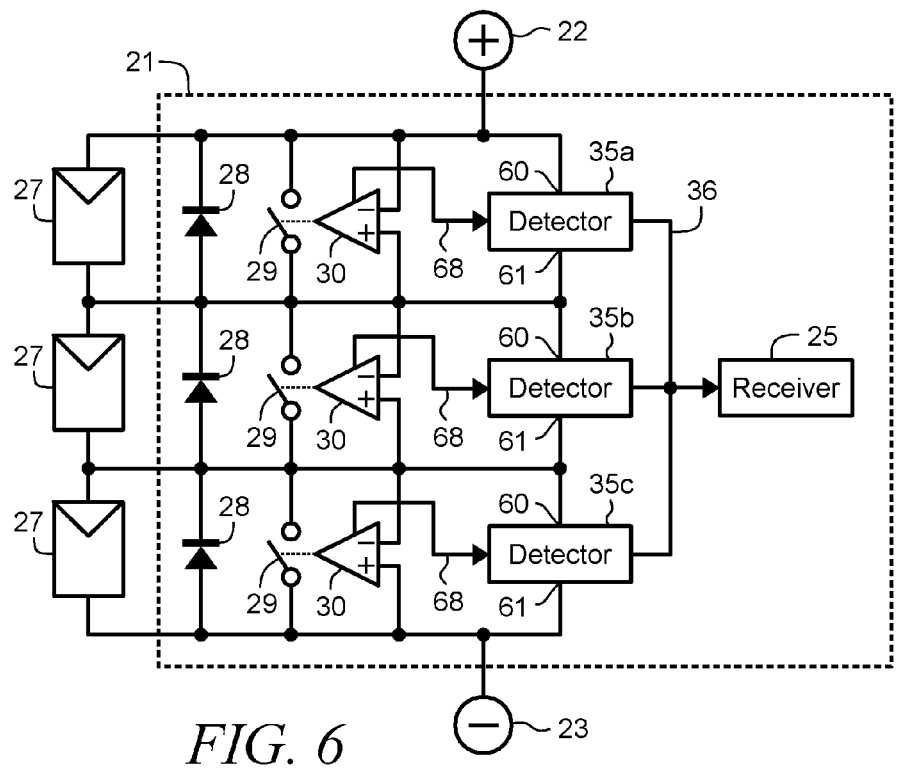
FIG. 6 is a simplified schematic diagram of a smart j-box including a plurality of detection circuits.

FIG. 6 is a simplified schematic of a smart j-box that includes a plurality of detection circuits 35a-35c. The transmitter, NVM, and power supply are not shown to keep the schematic simple. Each detection circuit has positive 60 and negative 61 inputs for detecting the transient voltage across one of the PV segments 27. The output 36 of each detection circuit is typically open-drain, so they can all be tied together (wire-OR) at the input of the receiver 25. Optionally, each bypass control circuit 30 may produce a blanking signal 68 that temporarily disables (blanks) the associated detection circuit while the switch 29 is opening or closing to further reduce the false-alarm rate.

Figure 7A:
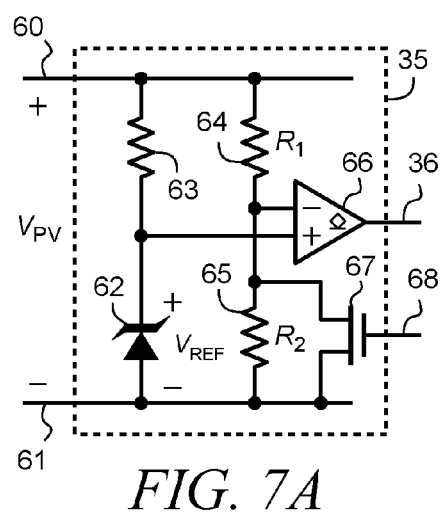
FIG. 7A is a simplified schematic diagram of a first example of the detection circuit.

FIG. 7A is a simplified schematic of a first example of the detection circuit 35. The open-drain output 36 of the voltage comparator 66 goes low, signaling detection, when voltage the between nodes 60 and 61 ($V_{PV}$) exceeds a predetermined voltage level threshold ($T_{LEVEL}$) given by equation 1 below. A zener diode 62 and bias resistor 63 produce a reference voltage ($V_{REF}$) for example 3.3 Vdc. The ratio of the two resistors 64 ($R_1$) and 65 ($R_2$) is typically chosen to set $T_{LEVEL}$ to about 17 Vdc. And a small MOSFET 67 may also be included to provide the optional blanking input 68.

$$T_{LEVEL}=V_{REF}(1+R_1/R_2) \quad (1)$$

Figure 7B:
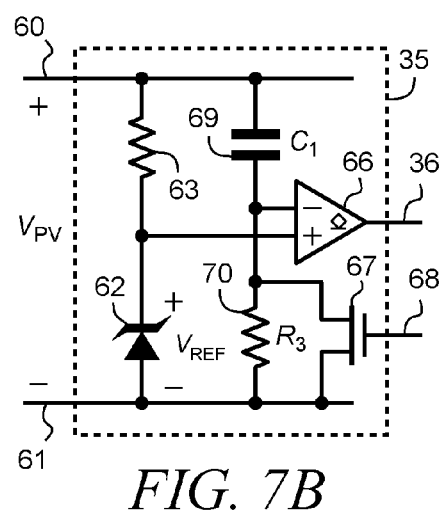
FIG. 7B is a simplified schematic diagram of a second example of the detection circuit.

FIG. 7B is a simplified schematic of a second example of the detection circuit 35. The output 36 is asserted (pulled low) when $V_{PV}$ changes at a rate that exceeds a predetermined voltage rate threshold ($T_{RATE}$) given by equation 2 below. The timing capacitor 69 ($C_1$) and resistor 70 ($R_3$) are typically chosen to set $T_{RATE}$ to about 50V/µs.

$$T_{RATE}=V_{REF}/(R_3 C_1) \quad (2)$$

It will be obvious to those with ordinary skill in electronic circuit design that another example of the detection circuit 35 could be produced by including both the circuits of FIGS. 7A and 7B and simply connecting their outputs 36 together, thereby making a combined detection circuit that asserts the output 36 if either $T_{LEVEL}$ or $T_{RATE}$ is exceeded.

Figure 8A:
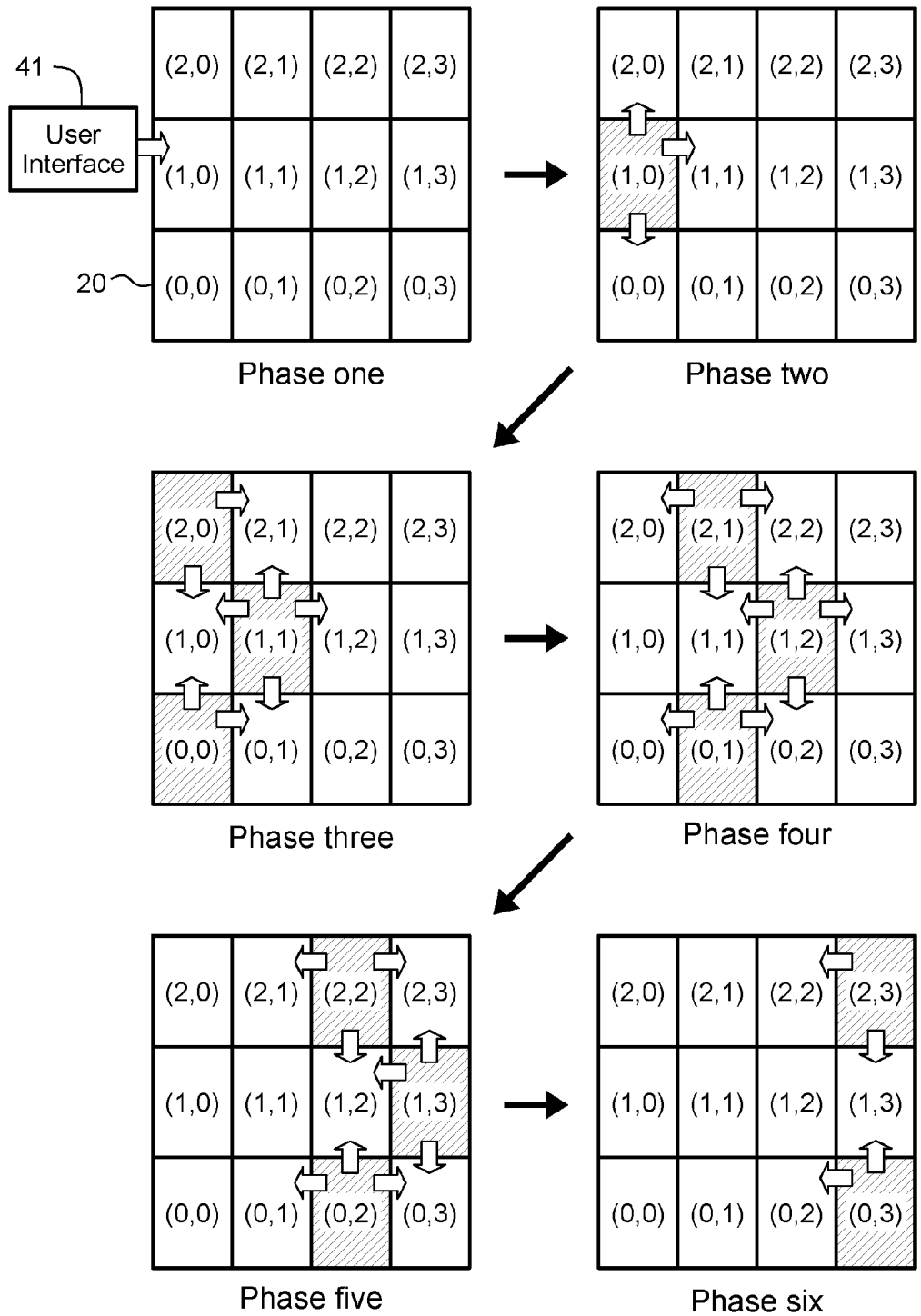
FIG. 8A is a high level diagram showing a first example of how signals propagate from module to module.

FIG. 8A is a high level diagram showing a first example of how a shut-down or restart signal is passed to all the smart j-boxes. In this example, twelve solar modules 20 are arranged into an array of three rows by four columns. The modules are referred to by their coordinates (row number, column number). In the beginning (phase one, in the upper left corner) the user interface 41 sends a signal that is received by module (1,0). As stated above, this first signal could be sent via a modulated magnetic field, a sound wave, or via the gateway device 44. Then in phase two, module (1,0) retransmits the signal to it's nearest neighbors (2,0), (1,1), and (0,0). Then in phase three, each of these modules retransmits the signal to modules (2,1), (1,2), and (0,1). And so on, until in phase five the last two modules (2,3) and (0,3) receive the signal. In phase six, these last two modules retransmit the signal, but with no effect since all the other modules have already received the signal.

The following points are notable: the array could be expanded to any size; it doesn't matter which module 20 initially receives the signal from the user interface 41; and there is redundancy because each module receives the signal at least twice. Also, when a module receives the signal, it retransmits at least once. For example, module (1,0) received the signal for the first time in phase one, and then again in phase three.

Figure 8B:
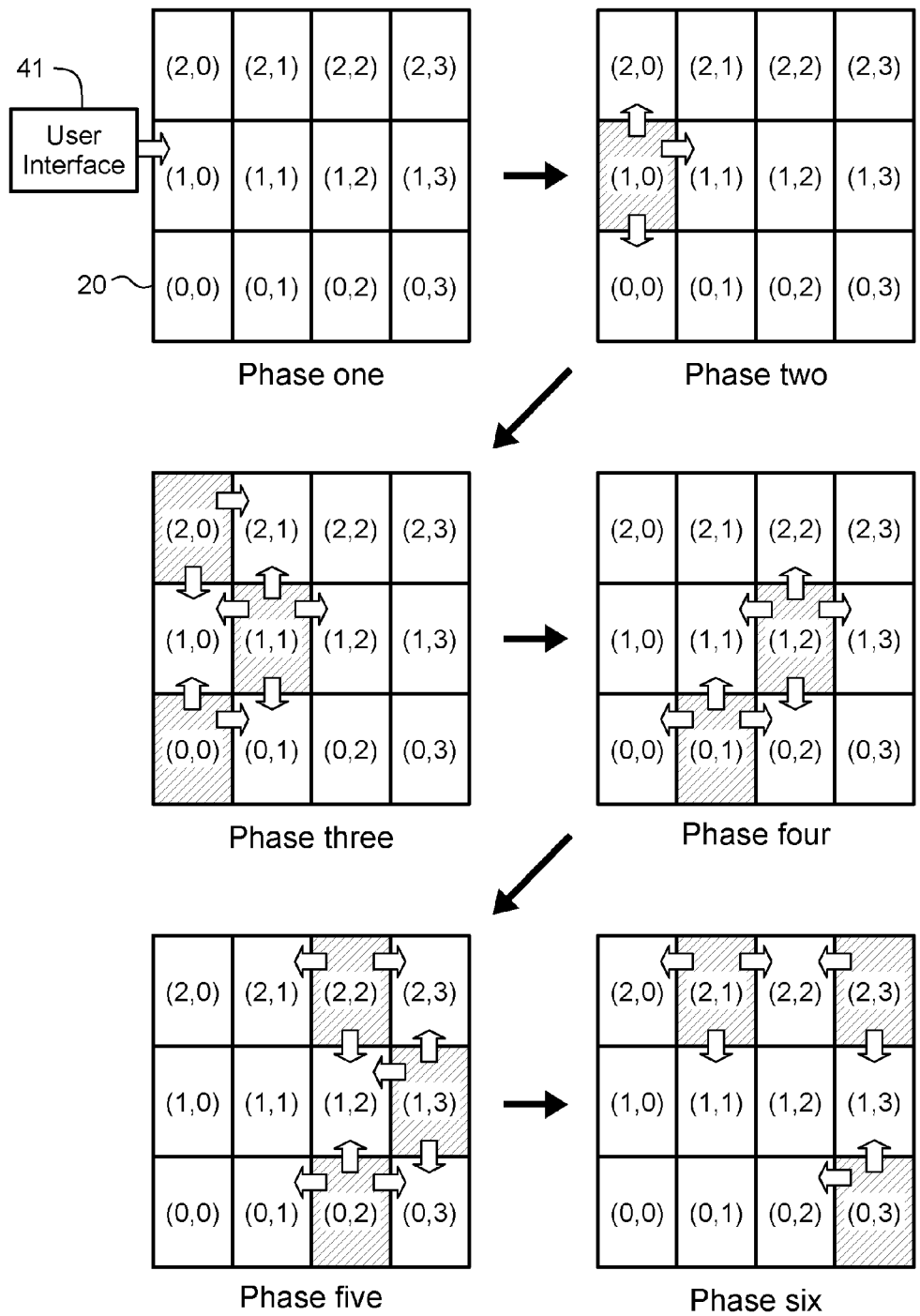
FIG. 8B is a high level diagram showing a second example of how signals propagate from module to module.

But a consequence of redundancy is the potential for collisions. For example, FIG. 8B shows the same 3×4 array, but in phase three module (2,1) did not receive the signal because modules (2,0) and (1,1) transmitted simultaneously, which is commonly known in the field of communication networks as a collision. The situation is analogous to when two people talk at the same time, and a third person can't understand what either of them is saying. Since module (2,1) did not understand the signal in phase three, it did not retransmit the signal in phase four. But note that module (2,1) gets another chance to receive the signal in phase five. Thus, the end result is the same as FIG. 8A, every module received the signal.

The redundant signally allows the system to tolerate some collisions, but it is also advantageous to minimize the probability of collisions. Therefore, the method comprises two well-known techniques for avoiding data collisions: Carrier Sense Multiple Access (CSMA); and random back-off delays. CSMA essentially means that each solar module 20 listens before transmitting. In other words, transmission is delayed if the receiver 25 detects that another smart j-box is transmitting. After the receiver no longer detects a signal, the smart j-box waits for a random back-off delay. If the carrier signal is not detected at the end of this back-off time, then the smart j-box begins to transmit. The random back-off delay decreases the probability that two smart j-boxes, both waiting for the same carrier signal to end, will start transmitting simultaneously.

Various means of implementing the CSMA and random (or pseudo-random) back-off delays will be readily apparent to those with ordinary skill in the art of electronic circuit design. For example, a microcontroller with firmware could obviously be used. The invention, without limitation, includes a novel implementation wherein the power supply 38 is used to produce the random back-off delays.

Figure 9A:
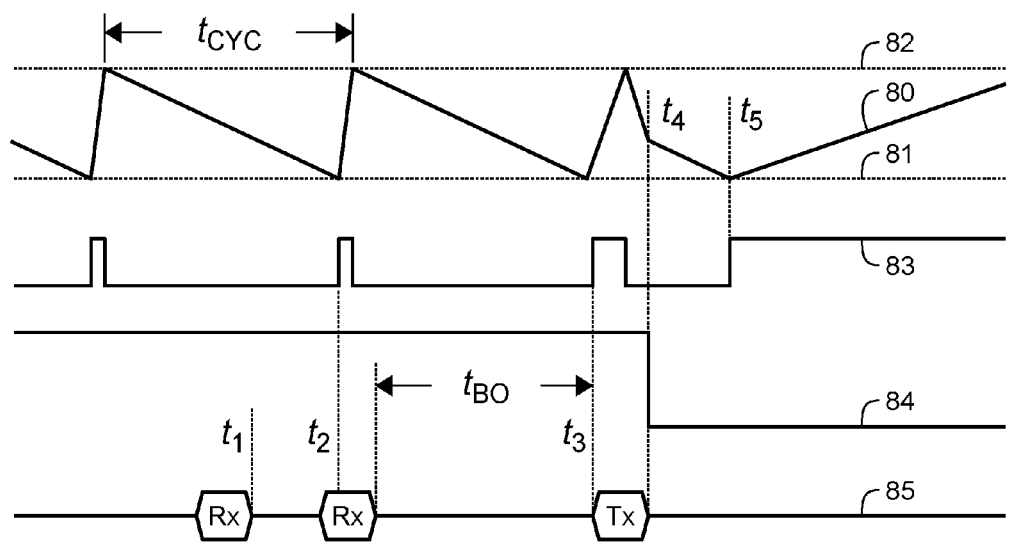
FIG. 9A is a high level timing diagram showing example waveforms as a smart j-box enters safe mode.

FIG. 9A is a high level timing diagram with example waveforms to illustrate this novel implementation of CSMA with random back-off delays in a smart j-box that is entering safe mode. Each smart j-box in the system 40 would go through a similar process as the shut-down signal is relayed from j-box to j-box across the solar array.

The top waveform 80 is the voltage across the power supply's output filter capacitor. During normal operation the power supply 38 operates in bursts with a period $t_{CYC}$. The second waveform 83 is the power supply enable signal (PS-enable). Each burst is enabled while PS-enable is high. In between bursts, the circuits (24-26, and 30) operate by utilizing energy stored in the capacitor, and the voltage 80 slowly ramps down. When the cap voltage 80 reaches a first predetermined threshold 81, PS-enable 83 goes high, starting a new burst, and the capacitor is quickly recharged. Each burst ends when the cap voltage 80 reaches a second predetermined threshold 82, causing PS-enable 83 to go low again.

The bottom waveform 85 shows communications: "Tx" stands for transmitting; and "Rx" stands for receiving. Transmission can happen only during the power supply bursts, and only if the receiver is not receiving a signal. For example, a first shut-down signal is received from a first smart j-box at time $t_1$. After that, the smart j-box wants to transmit, but it must wait for the next power supply burst. However, at time $t_2$, the smart j-box is receiving a second shut-down signal from a second smart j-box, so transmission is inhibited (CSMA). Finally, at time $t_3$, there is no received signal and the smart j-box begins transmitting.

At time $t_4$ transmission is complete and the smart j-box closes all the switches 29, thereby reducing $V_{OUT}$ 84 to approximately 200 mV. Note that the j-box could be designed to close the switches 29 immediately after the shut-down signal is received at $t_1$, but it is typical to delay closing the switches 29 until after transmission is complete at time $t_4$ because more power is available for the transmitter while the switches are open. For example, at time $t_5$, another power supply burst begins, but with $V_{OUT}$ 84 so low in safe mode, the power supply produces a lot less output current and the cap voltage 80 rises a lot slower and the burst is a lot longer.

Figure 9B:
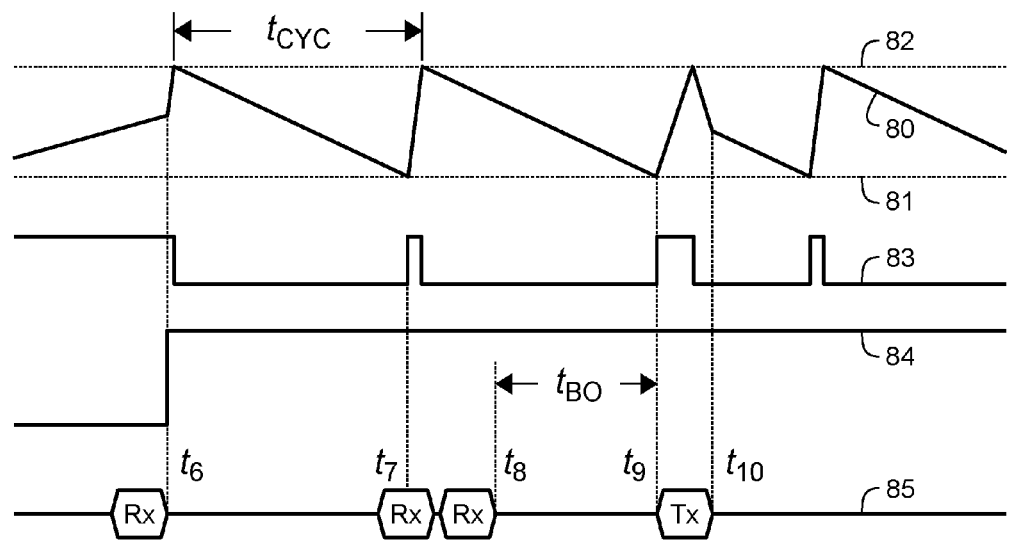
FIG. 9B is a high level timing diagram showing example waveforms as a smart j-box exits safe mode.

FIG. 9B is a high level timing diagram with example waveforms from a smart j-box that is restarting after being in safe mode. The initial state, to the right of $t_6$ is the same as the ending state from FIG. 9A. A first restart signal is received at time $t_6$, and in response, the switches 29 open and $V_{OUT}$ increases to somewhere between 10Vdc and 30Vdc, depending how many of the PV cells 27 are shaded, if any. Then the j-box wants to transmit the restart signal during the next power supply burst, but a second restart signal is being received at time $t_7$ so, because of CSMA, transmission is delayed until the next burst at $t_9$. But a third restart signal is received at $t_8$ so now $t_{BO}$ is from $t_8$ to $t_9$.

In both examples (FIGS. 9A-9B) the back-off time $t_{BO}$ is a random variable with uniform distribution over the interval of zero to $t_{CYC}$ because the power supply bursts are not synchronized with the bursts on other smart j-boxes, or with signals from the user interface. In normal operation $t_{CYC}$ is typically around 200 ms, but in safe mode $t_{CYC}$ may increase to as much as 500 ms.

Figure 10:
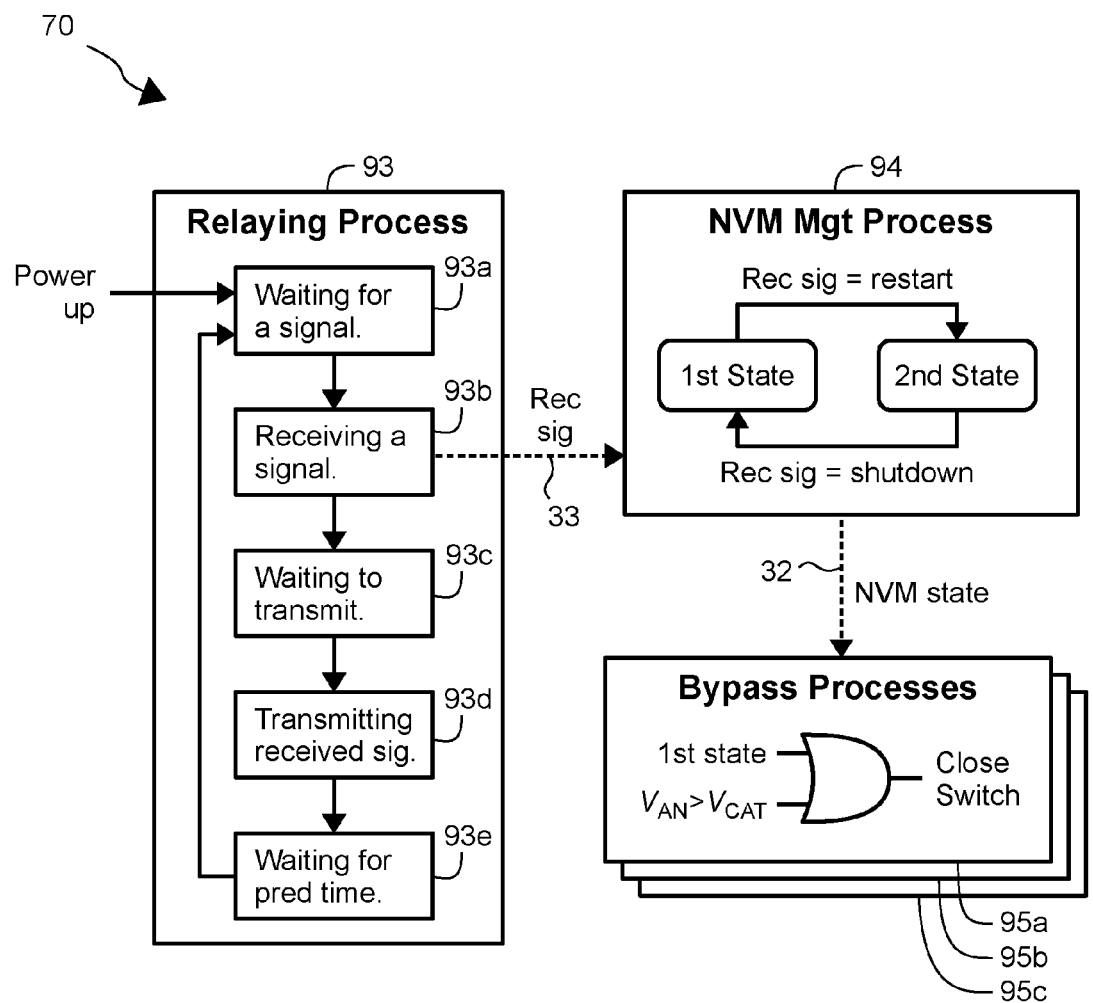
FIG. 10 is a high level diagram of the related method of operation.

FIG. 10 is a high level diagram of the method 70 of operation comprising a plurality of linked processes: a first process 93 for relaying signals from j-box to j-box using the transmitter 24 and receiver 25; a second process 94 for managing the nonvolatile memory 26; and a plurality of additional processes 95a-95c, one for each of the bypass control circuits 30.

The first process 93 is an endless loop comprising steps 93a-93e. When the solar module is first powered up, typically at sunrise, the relaying process 93 is initialized to the first step 93a, wherein the smart j-box waits to receive a signal. Normally, there will be no reason to enter safe mode (no fires) so the smart j-box will stay in step 93a all day long, day after day, year after year.

In the second step 93b, the signal is received. There are three ways for the receiver 25 to receive the shut-down signal: in the form of a modulated magnetic field or sound wave, transmitted from another j-box or from the user interface 41; as a signal from the user interface 41 via the gateway 44 and gateway interface 37; or as the signal 36 from the detection circuit 35 in response to the interruption of current flow. The receiver circuit 25 typically treats all three ways the same, producing the same output 33. The receiver 25 can receive the restart signal in either of the first two ways, but not from the detection circuit 35.

In the third step 93c, the smart j-box waits before transmitting. Step 93c is for collision avoidance, typically by CSMA with random back-off delay. For example, the smart j-box would typically wait until a power supply burst where the receiver circuit is not detecting any signals.

In the fourth step 93d the received signal is transmitted. The communication is typically half duplex, meaning that the smart j-box does not transmit at the same time it receives. So the receiver is typically disabled during the 93d step.

And in the fifth step 93e the smart j-box waits for a predetermined time period, then the process 93 loops back to 93a to wait for the next signal. The purpose of this delay is to prevent signals from being repeated endlessly back and fourth between adjacent j-boxes. For example, as noted in regard to FIG. 8A, typically one solar module on the periphery of the array receives the signal from the user interface, and then a wave of signals propagate from module to module across the array. Modules in the wake of that wave typically don't transmit a second time because they are waiting in step 93e. The predetermined time period is typically at least one second to allow the wave to pass by.

The relaying process 93 is not limited to just relaying shut-down signals and restart signals; it can also relay other other signals. For example, there could be a signal to initiate a self-test, or signals for enabling and disabling the detection circuit.

Additionally, the relaying process 93 may include steps that alter the signals in some way, rather than just repeating them verbatim. For example, the signals may include some bits representing a unique ID code assigned to each j-box, or other bits representing information such as the internal temperature of the j-box, or bits representing self-test results for the j-box. Therefore, the term "shut-down signal" encompasses all possible signals that include information telling a smart j-box to go into safe mode, and the term "restart signal" encompasses all possible signals that tell the smart j-box to exit safe mode.

The second process 94 manages the NVM 26 and is represented in FIG. 10 by a simple state diagram. If the received signal 33 is a shut-down signal, the NVM transitions to the first state, representative of the safe mode. If the received signal 33 is a restart signal, the NVM transitions to the second state, representative of normal operation.

Obviously, the NVM could include many bits, and thereby have many states. For example, one bit in the NVM could be used to decide if the j-box is in safe mode, and a second bit in the NVM could be used as a configuration bit for enabling the detection circuit. Two bits obviously make four possible states for the NMV: in two of those states the j-box would be in safe mode; while in the other two states the j-box would not be in safe mode. There could be many more bits in the NMV for things like: trimming an oscillator; or giving each j-box a unique serial number. So the "first state" is a general term meaning any state in the set consisting of all possible states wherein the j-box is in safe mode, and the "second state" means any state in the set consisting of all possible states wherein the j-box is not in the safe mode.

The method 70 also includes a plurality of processes, one for each bypass control circuit 30 represented in FIG. 10 by a simple logic diagram. The smart junction box typically has three bypass control circuits 30, so three processes 95a-95c are shown in FIG. 10, but obviously this could be expanded to any number of bypass circuits. Essentially, while the NVM 26 is in the first state, each bypass control circuit 30 is forced to close it's switch 29. But, while the NVM 26 is in the second state, each bypass control circuit 30 has the freedom to open or close it's switch 29 depending on the polarity of the voltage across the bypass diode 29; if the anode voltage ($V_{AN}$) is relatively higher than the cathode voltage ($V_{CAT}$) then the switch 29 is closed, thereby preventing the bypass diode 28 from getting hot.

Although several embodiments have been described in detail for purposes of illustration, various modifications may be made to each without departing from the scope and spirit of the invention. Accordingly, the invention is not to be limited, except as by the appended claims.

What is claimed is:

1. A smart junction box for a photovoltaic solar power module, comprising:
   a positive terminal and a negative terminal for connecting the solar power module to a solar array;
   a transmitter circuit for transmitting at least a shut-down signal and a restart signal;
   a receiver circuit for receiving at least the shut-down and restart signals produced by the transmitter circuits in other smart junction boxes in the solar array;
   a nonvolatile memory having at least a first state and a second state and arranged to:
      transition to the first state in response to the receiver circuit receiving the shut-down signal; and
      transition to the second state in response to the receiver circuit receiving the restart signal;
   a plurality of bypass circuits serially connected between the positive and negative terminals, each bypass circuit comprising:
      a bypass diode disposed to protect a group of photovoltaic cells from reverse bias,
      an electronically controlled switch connected in parallel with the bypass diode, and
      a control circuit for at least closing the electronically controlled switch while the nonvolatile memory is in the first state; and
   a power supply circuit arranged to receive power from the positive and negative terminals for providing energy to at least the transmitter, receiver, nonvolatile memory, and control circuits.

2. The smart junction box in claim 1, wherein the shut-down and restart signals are in the form of modulated magnetic fields.

3. The smart junction box in claim 1, wherein the shut-down and restart signals are in the form of modulated sound waves.

4. The smart junction box of claim 1, wherein the transmitter is adapted to at least:
   transmit the shut-down signal in response to the receiver receiving the shut-down signal; and
   transmit the restart signal in response to the receiver receiving the restart signal.

5. The smart junction box of claim 4, wherein the transmitter is further adapted to delay transmission until the receiver circuit is not receiving a signal.

6. The smart junction box of claim 5, wherein the transmitter is further adapted to delay transmission for an additionally period that is random over a predefined interval.

7. The smart junction box of claim 1, wherein the power supply is adapted to operate in bursts and the transmitter is adapted to transmit during the power supply bursts.

8. The smart junction box of claim 1, including at least one detection circuit coupled to the receiver for producing a detection signal in response to the interruption of the current flowing through the positive and negative terminals, and the receiver is adapted to interpret the detection signal as a shut-down signal.

9. The smart junction box of claim 8, wherein at least one detection circuit is configured to produce the detection signal in response to the voltage across at least one of the bypass circuits exceeding a predetermined level threshold.

10. The smart junction box of claim 8, wherein at least one detection circuit is configured to produce the detection signal in response to the voltage across at least one of the bypass circuits changing at a rate exceeding a predetermined rate threshold.

11. The smart junction box of claim 1, including an interface for at least receiving signals from a gateway device.

12. The smart junction box of claim 1, wherein the bypass control circuit is adapted to delay closing the switch in response to the nonvolatile memory being in the first state until the transmitter has finished transmitting.

13. A method of operation for a smart solar junction box with a safe mode, wherein the smart junction box comprises: a positive terminal and a negative terminal for connecting the smart junction box to a solar array; a plurality of bypass circuits serially connected between the positive and negative terminals, each bypass circuit comprising: a bypass diode, an electronically controlled switch connected in parallel with the bypass diode, and a control circuit for controlling the switch; a transmitter and a receiver for communicating with other smart junction boxes in the solar power array; and a nonvolatile memory; the method comprising a plurality of linked processes:
   a first process that is an endless loop for relaying signals to other smart junction boxes in the solar array comprising steps of:

waiting to receive a signal,
receiving the signal at the receiver,
waiting to transmit,
transmitting the received signal from the tranmitter, and
waiting for a predetermined time period;
a second process for managing the state of the nonvolatile memory comprising steps of:
transitioning the nonvolatile memory to a first state in response to the received signal being a shut-down signal, and
transitioning the nonvolatile memory to a second state in response to the received signal being a restart signal; and
an additional process for each of the bypass circuits comprising steps of:
closing the switch while the nonvolatile memory is in the first state or the anode voltage of the bypass diode is at a relatively higher potential than the cathode, and
opening the switch otherwise.

14. The method of claim 13 wherein the step of waiting to transmit comprises waiting until the receiver detects no signals.

15. The method of claim 14 wherein the step of waiting to transmit further comprises waiting for a time delay that is random over a predefined interval.

16. The method of claim 13 wherein the step of closing the switch is delayed until after the step of transmitting the received signal is completed.

17. The method of claim 13 wherein the step of receiving the signal comprises detecting a modulated magnetic field.

18. The method of claim 13 wherein the step of receiving the signal comprises detecting a modulated sound wave.

19. The method of claim 13 wherein the step of receiving the signal comprises detecting the interruption of current flow in the positive and negative terminals.

20. The method of claim 13 wherein the step of receiving the signal comprises receiving a signal from a user interface device.

* * * * *